Sept. 22, 1931.  E. B. SHAND  1,823,917
BALANCE TRANSFORMER CONNECTION FOR RECTIFIERS
Filed Oct. 11, 1927

INVENTOR
Errol B. Shand.
BY
ATTORNEY

Patented Sept. 22, 1931

1,823,917

UNITED STATES PATENT OFFICE

ERROL B. SHAND, OF PITTSBURGH, PENNSYLVANIA, ASSIGNOR TO WESTINGHOUSE ELECTRIC & MANUFACTURING COMPANY, A CORPORATION OF PENNSYLVANIA

BALANCE TRANSFORMER CONNECTION FOR RECTIFIERS

Application filed October 11, 1927. Serial No. 225,482.

My invention relates to metal-tank mercury-arc rectifiers, and it has particular relation to the transformer connections for supplying the same with power in such manner that the direct-current load divides between two anodes throughout the operating range.

My present invention is an improvement upon the star-diametrical connection of single-phase transformers which constitutes the subject-matter of my copending application, Serial No. 224,890, filed October 8, 1927, and assigned to the Westinghouse Electric & Manufacturing Company.

My aforesaid copending application points out and explains the advantages of so operating a rectifier as to cause the load current to divide between two anodes; the shortcomings of the previously used balance-coil connection which was utilized in a more or less unsuccessful effort to achieve the proper division of the load current; and the functioning of the star-diametrical connection of three single-phase transformers, without any auxiliary equipment, to permit the development of a triple-frequency voltage-wave component which caused the proper division of the load current between two anodes of the rectifier at all times throughout the operative range.

My star-diametrical connection is subject to the very slight disadvantage that, unless the apparatus is connected with a load which is not subject to fluctuations to zero, or unless measures are taken to connect an artificial resistance load, which will prevent the load from falling to extremely small values, an excessive voltage, which may be as high as 40 or 50% in excess of the normal value, is developed in the direct-current circuit at small loads of less than 3 to 5% of the full load of the rectifier.

While the correction of the above-mentioned disadvantage is readily effected by means of automatic relay equipment, or by the choice of proper loads for the rectifier, it may be desirable, for certain applications, to overcome the disadvantage just mentioned, and it is an object of my present invention to dispense with the star primary-winding connection of a bank of single-phase transformers, which develops a sharply peaked voltage-wave at low load, giving rise to the excessive rectifier voltage under such conditions, and to develop the necessary triple-frequency voltage-wave components in a set of three single-phase balance transformers which are connected in diametrical-star.

Figure 1:
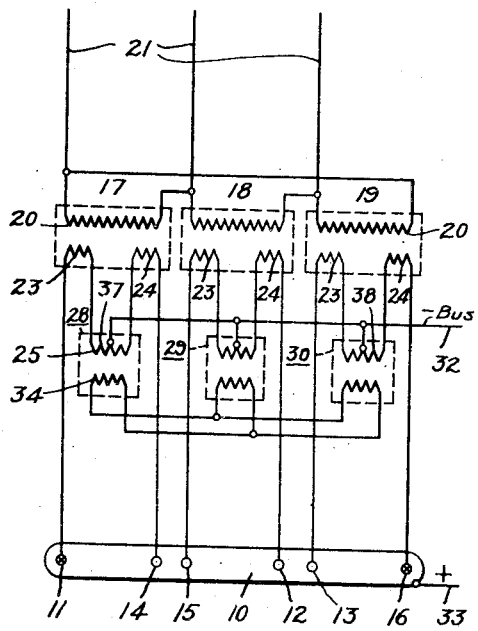
Figure 3:
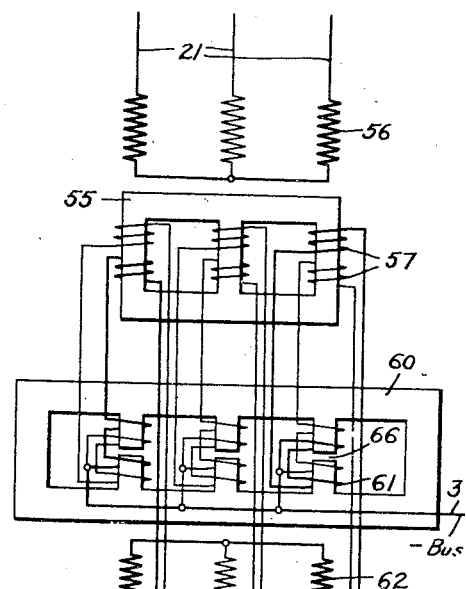
Figure 2:
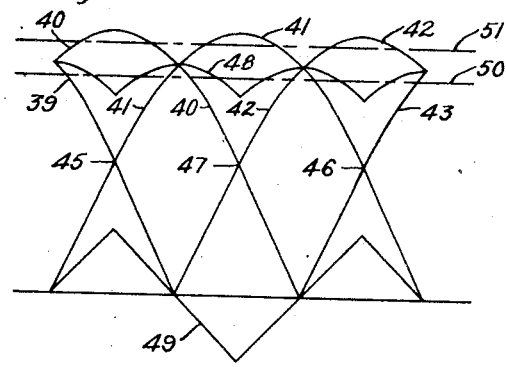
Figure 2:
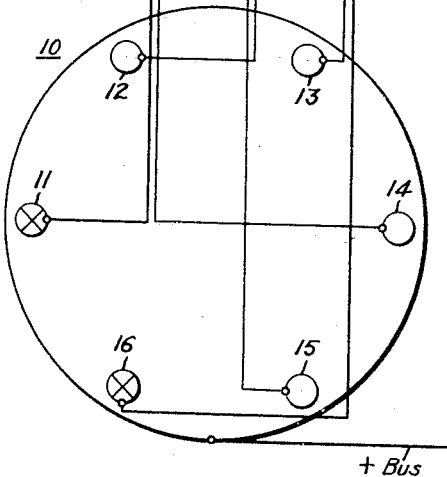

With the foregoing and other objects in view, my invention consists in the methods and apparatus hereinafter described and claimed, and illustrated in the accompanying drawings, wherein Fig. 1 is a diagrammatic view of circuits and apparatus embodying my invention in a form which is at present preferred, Fig. 2 is a wave-form diagram to which reference will be made in the explanation of my invention, and Fig. 3 is a view, similar to Fig. 1, illustrating a modified form of embodiment of my invention.

In the form of embodiment illustrated in Fig. 1, a rectifier 10, having six anodes 11, 12, 13, 14, 15 and 16, is energized from a blank of three single-phase transformers 17, 18 and 19, the primary windings 20 of which are connected in delta across a substantially balanced three-phase supply line 21. Each of the single-phase transformers just mentioned is provided with two secondary windings 23 and 24, the outer terminal of each of which is connected to one of the six anodes 11 to 16.

The inner terminals of the two secondary windings of each of the above-mentioned single-phase transformers are connected together through a double primary winding 25 of one of three balancing transformers 28, 29 and 30, the three primary windings 25 of said balancing transformers being provided with mid-taps which are solidly connected together and to the return conductor 32 of the direct-current circuit, the positive conductor of the direct-current circuit being connected to the rectifier tank 10, as indicated at 33.

Each of the three balancing transformers 28, 29 and 30 is provided with a secondary winding 34, and the three secondary windings are connected together in short-circuited star, for the double purpose of preventing the balance transformers from developing any sinusoidal voltages of the fundamental frequency, and for causing any harmonic voltage that appears in any one of the three balancing transformers to be immediately transformed to the other two.

No sinusodial, fundamental-frequency, polyphase voltages are developed in the balancing transformers because their star-connected secondary windings are short-circuited, which means that they are in parallel with each other, and hence the voltages in each of the short-circuited phases must be equal at every instant. As this is impossible, in a system of balanced three-phase voltages of the fundamental frequency, such voltages are eliminated from the balancing transformers.

On the other hand, the effect of the short-circuited star-connection of the secondary windings 34 of the balancing transformers is to take the triple-frequency voltage-components, or the third harmonic of the voltage wave, out of the main transformers 17, 18 and 19, and to cause them to be developed in the balancing transformers.

Thus, if one of the anodes 11 should take all of the load current, the current would return through the left-hand half of the primary winding of the balancing transformer 28, which would develop a high voltage in the secondary winding 34 of the said balancing transformer, because the latter would be substantially open circuited, as long as no load currents were flowing in the primary windings 25 of either of the other balancing transformers 29 and 30. As the three secondary windings 34 are connected in parallel to each other, the same high voltage appears in each of the other balancing transformers and is induced in the primary windings 25 of said other transformers, thereby increasing the potentials of the two adjacent positive anodes 12 and 16.

Owing to the high state of ionization of the entire space within the rectifier, it follows that an arc always strikes between the mercury cathode and the most positive of the anodes, so that one of the adjacent anodes 12 or 16, say 16, is caused to strike an arc and share the current with the loaded anode 11. When this happens, equal currents will flow in the left-hand half of the primary winding of the balancing transformer 28, and in the right-hand half of the primary winding of the balancing transformer 30, as indicated at 37 and 38, respectively, in Fig. 1. The two currents neutralize each other's inductive effects, by reason of the secondary connections 34, so that substantially no impedance is offered to the flow of properly balanced load currents through the primary windings of the balancing transformers.

The action just described may perhaps be better understood by reference to Fig. 2, wherein the curves 39, 40, 41, 42 and 43 show the wave forms and displacements of the voltages occurring in five of the six secondary windings of the main transformers 17, 18 and 19.

If each of the six anodes is to carry current for one-third of a cycle, so that two anodes will be carrying current at all times, it follows that the anode corresponding to the central wave 41 must carry current during the top two-thirds of the half-wave; that is, from the time indicated by the point 45, to the time indicated by the point 46. During the first half of this time, or until the point 47 is reached, the said anode is sharing the load with the anode corresponding to the next leading wave-form 40. During the second half of its period of operation, the first-mentioned anode shares its current with the anode corresponding to the next lagging wave-form 42.

As all of the anodes are connected together in parallel to the same direct-current circuit, the potentials of the two anodes which are carrying current at any instant must be the same, which is the average between the respective portions of the wave 41 and the waves 40 or 42, respectively, as indicated by the humped curve 48 in Fig. 2. The difference between the humped curve 48 and the fundamental wave 41 is a substantially triangularly shaped triple-frequency wave-component, as shown by the curve 49 in Fig. 2, which represents the voltage developed in the balancing transformers 28, 29 and 30.

The average direct-current voltage is the average of the humped curve 48, as indicated by the dot-and-dash line 50 in Fig. 2, and it has the value of .828 times the peak value of the fundamental wave 41, which is characteristic of the three-phase operation of rectifiers.

At extremely light loads, smaller than the value of the magnetizing current of the balancing transformers 28, 29 and 30, the latter become ineffective, so that, at no-load, the voltage rises to a maximum of 15% higher than the operating voltage 50, as indicated by the dot-and-dash line 51 in Fig. 2, which is the average of the top sixth of each of the waves, representing the condition of six-phase rectifier operation, which is characterized by a direct-current voltage of .955 times the peak value of the fundamental wave 41.

As the primary windings of the main transformers 17, 18 and 19 are connected in delta, the main transformers develop substantially sinusoidal voltages at all times, and hence the high low-load voltages characteristic of the star-diametrical connection are avoided.

There is a very important difference between the operation of my balancing transformers and the operation of the hereinbefore-mentioned previously used balance coil which was connected between the two star points of two Y-connected secondary-winding groups, as covered by the Fortescue Patent No. 1,241,505, granted October 2, 1917. In the old balance-coil connection, each half of the balance coil was traversed by the unidirectional currents from three anodes, and as the currents flowed successively, with a slight overlapping, any tendency for one Y-group to carry more than its half of the current would immediately cause saturation of the balance coil, rendering it ineffective. As the unbalanced uni-directional magnetizing currents were continuous, the saturating effect was cumulative, and the flux density built up to extremely high values.

In my new balancing-transformer connection, on the other hand, the current in each half of each of the three balance coils flows for only one-third of a cycle, after which the flux in the core returns to its residual value, which is at the point where the hysteresis loop cuts the Y-axis on its downward movement. This point occurs at about the knee of the saturation curve, or a little lower, and represents the maximum possible biasing-flux resulting from the direct-current flux. As the magnetomotive force reverses some time during the next half-cycle, when current is flowing through the other half of the balance coil, the direct-current excitation is not cumulative, as it was in the old balance-coil connection.

It will be noted, from the foregoing explanations, that the main transformer bank does not need to be a delta-connected bank of separate single-phase transformers. Any transformer bank or arrangement, which results in the production of substantially symmetrical sinusoidal secondary voltages, such as are indicated by the wave forms 39 to 43 in Fig. 2, will be suitable. The conditions are satisfied, for example, by a three-phase transformer on a three-legged core, with the primary windings connected either in delta or in Y; three single-phase transformers with the primaries connected in Y and with a delta-connected tertiary winding; or more complex connections.

By way of illustration, one of the above-mentioned alternative transformer connections is illustrated in connection with my invention, in Fig. 3, wherein a main polyphase transformer having a three-legged core 55 is provided with star-connected primary windings 56 and six secondary windings 57, one primary winding and two secondary windings being mounted on each leg of the core.

In like manner, the balancing transformers, while they must be single-phase in their operation, do not need to be mounted in separate oil-tanks, so long as substantially independent flux paths are provided for the several transformers. Thus, certain shell-type polyphase cores constitute, in effect, merely three single-phase transformer-cores, in which the flux or load conditions of one have substantially no effect upon the flux or load conditions of any other, a polyphase core being provided merely for convenience in design and the economy resulting from the use of a single oil tank.

In a similar manner, the balancing transformers can be made on a five-legged polyphase core, the single-phase windings being put on the three central legs, respectively, while the end legs provide return paths for the magnetic flux, which make it possible for substantially independent fluxes to flow through the three wound legs of the core.

A three-legged core would be unsuitable for the three balancing transformers, because, in such a core, the sums of the fluxes in the three legs must be equal to zero, and hence the sums of the differentials of the fluxes with respect to time (or the voltages) must be equal to zero. Thus, on a three-legged core-type transformer, only balanced fundamental voltages can be present and no third-harmonic voltages are possible, because the sums of the three third-harmonic voltages would be equal to three times the component in a single phase.

A five-legged transformer core 60 is shown, by way of illustration, in Fig. 3, the three central legs being provided with diametrically connected primary windings 61 and with short-circuited star-connected secondary windings 62, the primary windings 61 being connected to the six secondary phases 57 of the main transformer, and the star point of the primary windings being connected to the negative bus 32 of the direct-current circuit. It will be understood that two primary windings 61 and one secondary winding 62 are mounted on each of the three central legs of the five-legged core 60.

In order to increase the effectiveness of the unwound end legs of the five-legged core 60 in Fig. 3, the three central legs are provided with air gaps 66.

In order to compensate for the unbalanced conditions that would otherwise be produced by the air gaps 66, the diametrically connected primary windings 61 of the balancing transformers are interlaced or transposed, as shown in the drawing, and as specified in the patent to Fortescue, No. 1,239,896, granted September 11, 1917 and assigned to the Westinghouse Electric & Manufacturing Company. It will be understood that the secondary windings of the main transformer bank, in the embodiments of my invention shown in both Fig. 1 and Fig. 3, will also be similarly interlaced or transposed, in accordance with the ordinary design of transformers for use with rectifiers; because, otherwise, very excessive reactances would be developed in the main transformer windings by reason of the fact that the rectifier anodes carry current for only a portion of a cycle each, and also by reason of the fact that slight differences in reactances, which would otherwise occur, would produce extreme unbalances in the rectifier current.

The combined k. v. a. rating of the three balancing transformers is some 61% of the rating of the two secondaries of one of the main transformers and is about 73% greater than the rating of the old balancing coil of the previously used balancing-coil connection which is discussed more completely in my aforesaid copending application. Reference may also be had to two articles by M. E. Reagan and myself in the current issue of the Electric Journal, which was published on or about October 3, 1927, for a further discussion of my invention, for a comparison with the devices of the prior art, and for a description of automatic substation equipment which may, or may not, be employed with my invention.

The k. v. a. ratings may readily be calculated, assuming the direct current of the load to be unity and the root-mean-square value of the voltage appearing in one of the six secondary windings of the main transformer bank to be unity. The root-mean-square value of the current in each of the secondary windings of the main transformer bank will be only .289, because the current flows for only one-third of a cycle in each winding. As each of the three main transformers has two secondary windings, the total k. v. a. rating of the two secondary windings is $.289 \times 2 \times 1 = .578$.

In the case of the balancing transformers of my invention, the voltage across each half of the balancing winding 25 or 61 on the primary side has a triangular wave-form, as shown at 49 in Fig. 2, the peak value of which is one-fourth of the peak value of the sinusoidal fundamental wave of one of the secondary windings of the main transformer, or $.25 \times 1.414 = .353$. The root-mean-square value of a triangular wave is .577 times its peak value. Thus, in the present case, the root-mean-square value of the voltage of one-half of each of the balancing coils 25 or 61 is $.577 \times .353 = .203$. The entire voltage across the two sides of each of the balancing coils 27 or 61 of each balancing transformer is .406. The root-mean-square value of the current in the same winding is .289, or actually somewhat less than that, say .285, by reason of the softening of the sharp corners of the theoretical current wave, as a result of the inductance of the circuits. The combined k. v. a. capacity of the primary windings of the three balancing transformers is, therefore, $$.285 \times .406 \times 3 = .35,$$

which is about 61% of the k. v. a. of the two secondary windings of one of the main transformers.

The k. v. a. capacity of the old balance coil which my invention replaces may also be readily computed. The root-mean-square of its total voltage is .406, the same as for one of my balancing transformers. The current in the old balancing coil is one-half of the direct current, so that its total k. v. a. rating is $.406 \times .5 = .203$.

It will be noted that the combined rating of the primaries of my three balancing transformers is 73% higher than the rating of the old balancing coil which my invention displaces. It should be noted, however, that with the ordinary balance coil, there is frequently a possibility of unbalance between the currents in different groups of anodes, with the result that an abnormal load is placed upon part of the transformers and some of the anodes. My balancing transformers produce a better balance, thus making far more effective use of the main parts of my apparatus, which are the main transformers and the rectifier tank.

The discussion just given has had to do particularly with the primary windings of the balancing transformers. The presence of the short-circuited secondary windings slightly increases the figures just given.

The rating of my three balancing transformers, in comparison with the rating of each of the main transformers, is by no means indicative of the actual material employed, because the voltages induced in the balancing transformers are of triple frequency, so that the actual material in the three triple frequency transformers (including their secondary windings) is only about 10 or 11% of the total material in the main transformer-bank.

From the foregoing description, it will be noted that I have provided a very effective means for causing an exact balancing of the currents between two anodes of the rectifier at all times, and that I have prevented the occurrence of the excessive over-voltages which were a characteristic feature of my star-diametrical transformer-connection.

By reason of the fact that I have taken the triple-frequency fluxes out of the main transformers and put them into auxiliary balancing transformers, I have been able to reduce the amount of iron in the main transformers by about 6 or 7% as compared to the quantity required in the star-diametrical connection.

Furthermore, the magnetizing currents of my balancing transformers may be made as small as is desirable, so that even the slight 15% voltage-rise which occurs, with my present connections, at absolutely zero load, will not occur until the load has reached a value corresponding to the said magnetizing currents which may be smaller than any practical load which would be supplied by my rectifier.

While I have illustrated my invention in two different embodiments and have suggested certain broad principles and ranges of equivalents which may be adapted, it will be understood that the foregoing and other changes may be made by those skilled in the art without departing from the essential features and advantages of my invention. I desire, therefore, that the appended claims shall be given the broadest interpretation consistent with their language when read in the light of the accompanying specification and the prior art.

I claim as my invention:

1. In a rectifier system comprising a substantially balanced three-phase supply line, a direct-current load circuit, and rectifying means having six rectifying paths interposed therebetween and having a common direct-current terminal, the combination, with said rectifying means, of a main transformer aggregate having a three-phase primary connection of such nature that the three primary phase-voltages are always substantially balanced, regardless of the load conditions on the several phases, and having two secondary windings for each primary phase, and an auxiliary transformer aggregate comprising three balancing coils, each coil being connected respectively between the two secondary windings associated with each primary phase, the three neutral points of said balance coils being solidly connected together to constitute the other direct-current terminal, means for maintaining the fluxes in the different phases of said auxiliary transformer aggregate at any moment substantially equal, the rectifying paths being connected to the respective secondary windings of the main transformer aggregate.

2. The combination with a main transformer bank having six separate secondary windings in which the voltages are substantially sinusoidal and in symmetrical six-phase relation to each other, of three balancing transformers having substantially independent flux paths, each of said balancing transformers comprising a primary winding having a mid-tap, the three mid-taps being solidly connected together, and each of the balancing transformers having a secondary winding, the three secondary windings last mentioned being connected together in short-circuited Y, and connections whereby the three primary windings of the balancing transformer complete the three diametrical connections of the six-phase secondary windings of the main transformer bank.

3. The combination with a main transformer bank having six separate secondary windings in which the voltages are substantially sinusoidal and in symmetrical six-phase relation to each other, of three balancing transformers having substantially independent flux relations, each of said balancing transformers having a primary winding having a mid-tap, the three mid-taps being solidly connected together, and each of the balancing transformers having a secondary winding, the three secondary windings last mentioned being connected together in short-circuited Y, connections whereby the three primary windings of the balancing transformer complete the three diametrical connections of the six-phase secondary windings of the main transformer bank, a rectifier having six rectifying paths connected to a common direct-current terminal, the aforesaid solidly connected mid-taps constituting the other direct-current terminal, and connections for energizing the six rectifying paths from the six-phase secondary windings of the main transformer bank.

4. A rectifier device having six rectifying paths, and an alternating-current supply system therefor including therein a star-diametrical group of single-phase transformers wherein the neutral point of the diametrical connection constitutes one terminal of the recified-current circuit, and the star connection permits the development of material third-harmonic voltages in the diametrical connection, characterized further in that the star-connected windings are short-circuited to exclude the fundamental-frequency voltages from the said single-phase transformers.

5. The combination with a multiple-anode rectifier device, of a source of substantially balanced sinusoidal polyphase voltages therefor, and a separate serially connected source of higher-frequency polyphase voltages for causing the current to divide, at every instant, between a plurality of anodes, the said source of higher-frequency voltages comprising auxiliary windings for causing it to offer a substantially negligible impedance to the flow of currents when they are properly divided among the anodes.

6. The combination with a rectifier having six rectifying paths, of a main transformer bank having six separate secondary windings in which the voltages are substantially sinusoidal and in symmetrical six-phase relation to each other, an auxiliary bank of three balancing transformers having substantially independent flux paths, each of said balancing transformers having a primary winding having a mid-tap, the three mid-taps being solidly connected together, and each of the balancing transformers having a secondary winding, the three secondary windings last mentioned being connected together in short-circuited Y, connections whereby the three primary windings of the balancing transformer complete the three diametrical connections of the six-phase secondary windings of the main transformer bank, and connections for energizing the six rectifying paths from the six-phase secondary windings of the main transformer bank.

7. A rectifier device having six rectifying paths, an alternating-current supply system therefor comprising a source of six separate voltages having substantially sinusoidal wave-forms under all conditions and constituting a substantially symmetrical open-star six-phase system, a balancing coil connected between each two diametrically related phases of said supply system, the three mid-points of the three balancing coils being connected to one load terminal of the rectifier, and means for causing the voltages and fluxes of the three balancing coils to be substantially equal at every instant.

8. A rectifier device having six rectifying paths, an alternating-current supply system therefor comprising a source of six separate voltages having substantially sinusoidal wave-forms under all conditions and constituting a substantially symmetrical open-star six-phase system, a balancing coil connected between each two diametrically related phases of said supply system, the three mid-points of the three balancing coils being connected to one load terminal of the rectifier, a separate magnetic core for each of said three balancing coils, and means for causing the voltages and fluxes of the three balancing coils to be substantially equal at every instant.

9. A rectifier device comprising $2m$ rectifying paths, where $m$ is an integer greater than 1, a source of substantially symmetrical polyphase voltages, the phases of said source being separate, one terminal of each of the successive phases being connected to one terminal of the successive rectifying paths, respectively, the other terminals of the rectifying paths being connected to one direct-current load-circuit terminal, $2m$ coils connecting the other terminals of the several phases of said source to the other direct current load-circuit terminal, and means for causing the flux and voltage conditions in each successive coil to be substantially equal and opposite to the flux and voltage conditions in the two next adjacent coils at every instant.

10. A rectifier device comprising $2m$ rectifying paths, where $m$ is an integer greater than 1, a source of substantially sinusoidal and substantially symmetrical polyphase voltage, the phases of said source being separate, one terminal of each of the successive phases being connected to one terminal of the successive rectifying paths, respectively, the other terminals of the rectifying paths being connected to one direct-current load-circuit terminal, $2m$ coils connecting the other terminals of the several phases of said source to the other direct-current load-circuit terminal, and means for causing the flux and voltage conditions in each successive coil to be substantially equal and opposite to the flux and voltage conditions in the two next adjacent coils at every instant.

11. A rectifier device comprising $2m$ rectifying paths, where $m$ is an integer greater than 1, a source of substantially symmetrical polyphase voltages, the phase of said source being separate, one terminal of each of the successive phases being connected to one terminal of the successive rectifying paths, respectively, the other terminals of the rectifying paths being connected to one direct-current load-circuit terminal, $2m$ coils connecting the other terminals of the several phases of said source to the other direct-current load-circuit terminal, said $2m$ coils being mounted on a plurality of magnetizable cores so arranged and connected that the magnetomotive force reverses in each core during each cycle, and means for causing the flux and voltage conditions in each successive coil to be substantially equal and opposite to the flux and voltage conditions in the two next adjacent coils at every instant.

12. A rectifier device comprising $2m$ rectifying paths, where $m$ is an integer greater than 1, a source of substantially sinusoidal and substantially symemtrical polyphase voltages, the phases of said source being separate, one terminal of each of the successive phases being connected to one terminal of the successive rectifying paths, respectively, the other terminals of the rectifying path being connected to one direct-current load-circuit terminal, $2m$ coils connecting the other terminals of the several phases of said source to the other direct-current load-circuit terminal, said $2m$ coils being mounted on a plurality of magnetizable cores so arranged and connected that the magnetomotive force reverses in each core during each cycle, and means for causing the flux and voltage conditions in each successive coil to be substantially equal and opposite to the flux and voltage conditions in the two next adjacent coils at every instant.

In testimony whereof, I have hereunto subscribed my name.

ERROL B. SHAND.